May 25, 1948.   H. T. BOOTH   2,442,032
VISCOSITY MEASURING INSTRUMENT
Filed Aug. 17, 1944   3 Sheets-Sheet 1

INVENTOR.
HARRY T. BOOTH
BY C. T. Stevens
ATTORNEY.

May 25, 1948.  H. T. BOOTH  2,442,032
VISCOSITY MEASURING INSTRUMENT
Filed Aug. 17, 1944  3 Sheets-Sheet 2

INVENTOR.
HARRY T. BOOTH
BY C. B. Stevens
ATTORNEY.

May 25, 1948.   H. T. BOOTH   2,442,032
VISCOSITY MEASURING INSTRUMENT
Filed Aug. 17, 1944   3 Sheets-Sheet 3
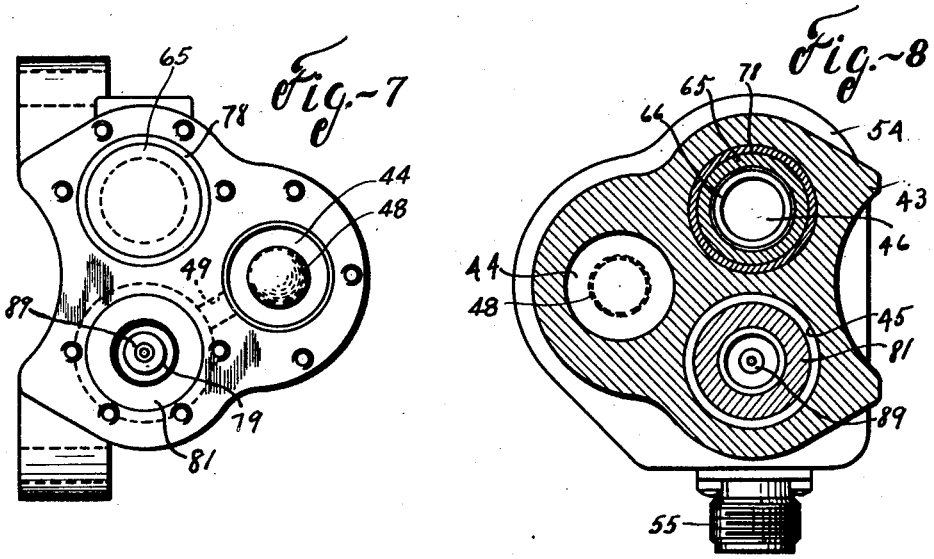
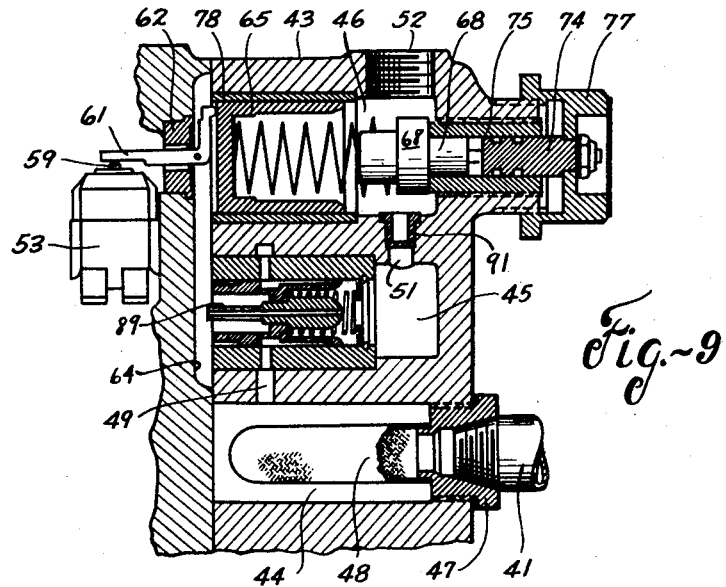
INVENTOR.
HARRY T. BOOTH
BY C. B. Stevens
ATTORNEY.

Patented May 25, 1948

2,442,032

UNITED STATES PATENT OFFICE 2,442,032

VISCOSITY MEASURING INSTRUMENT

Harry T. Booth, Dayton, Ohio, assignor to United Aircraft Products, Inc., Dayton, Ohio, a corporation of Ohio Application August 17, 1944, Serial No. 549,907

16 Claims. (Cl. 73—55)

This invention relates to instruments for use in viscosity control systems, and particularly for use in dilution systems wherein it is desired automatically to interrupt the process of dilution when a predetermined condition of viscosity is attained. The instrument of the invention has especial though not limited application in a system relating to the viscosity control of lubricating oil in aircraft engines. In such systems, in order to avoid the difficulties caused by congelation in the engine bearings, a diluent is added to the lubricating oil prior to shutting off of the engine so that an easily flowable lubricant is immediately available when the engine is next started. The function of the instrument in the system is to measure the viscosity of the oil during dilution and to prevent the addition of any more than a predetermined quantity of the diluent.

Broad aspects of the instrument and of the system in which it is illustratively embodied are disclosed and claimed in Harry T. Booth, Patent No. 2,400,910, dated May 28, 1946, and Booth et al. application Serial No. 506,716, filed October 18, 1943, respectively.

A general object of the invention is to improve upon the earlier instrument to the end that it may be made more serviceable and be more adaptable to the widely varying requirements of military aircraft.

A specific object of the invention is to create in the instrument a response to changing fluid viscosity, whatever the cause of such change, and to render the instrument operable to perform an action of control only when the modified fluid viscosity is the result of dilution.

Another object of the invention is to permit variable adjustment of the instrument in order that interruption of the dilution process may take place when a pre-selected degree of dilution is attained.

A further object is to enable pre-setting of the instrument, in accordance with the desired dilution value, to be accomplished through a simple dial adjustment.

Other objects and structural details of the invention will appear from the following description, when read in connection with the accompanying drawings, wherein.

Figure 4:
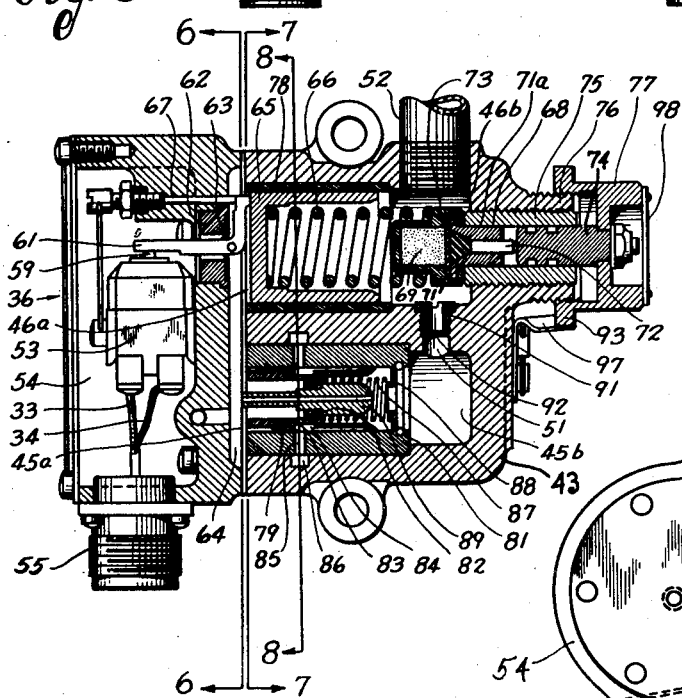
Fig. 4 is a view of the instrument in longitudinal section.
Figure 6:
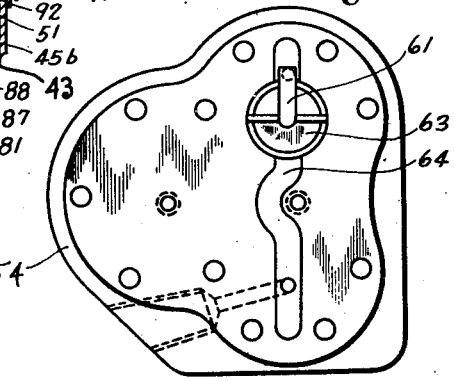

Figs. 6, 7 and 8 are views in cross section, taken along the respective lines 6—6, 7—7 and 8—8 of Fig. 4; and Fig. 9 is a diagrammatic view of the instrument, illustrating the relation between the fluid passages and the fluid controlled parts therein.

The illustrative embodiment of the invention shows it disposed in a system for diluting the lubricating oil of an aircraft engine.

Figure 1:
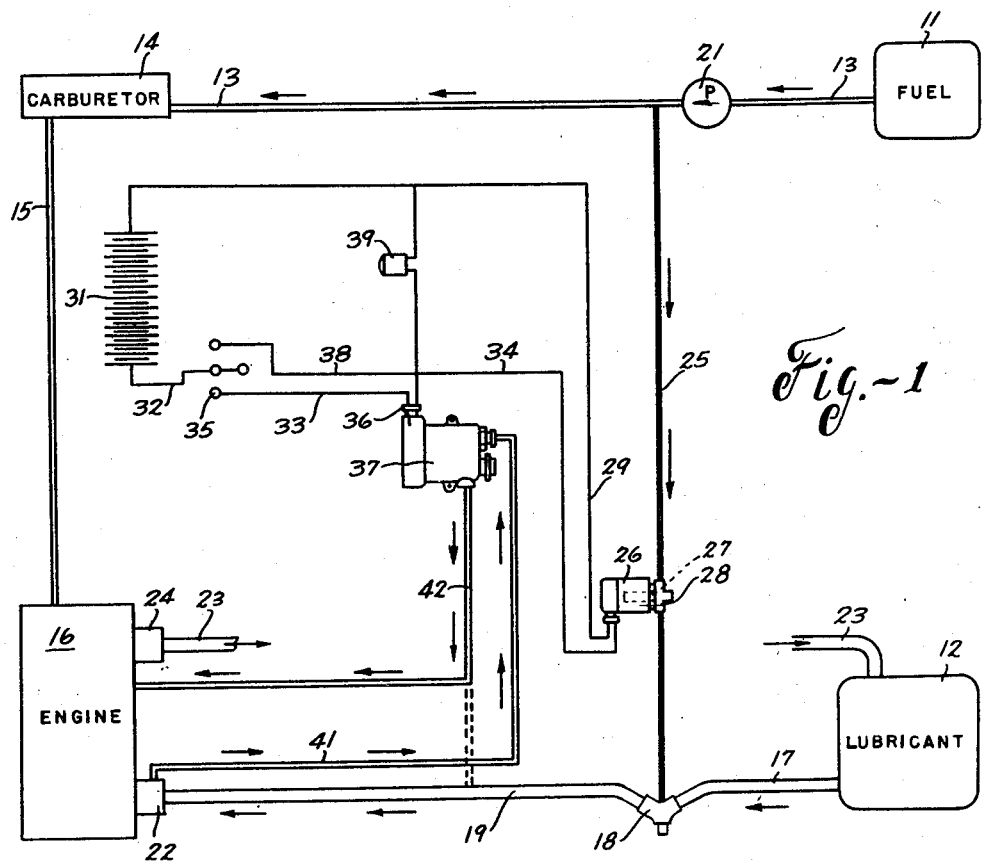
Fig. 1 is a diagram showing an instrument constructed in accordance with this invention incorporated in an oil dilution system for aircraft engines.

Referring to Fig. 1, reservoirs 11 and 12 are respectively a tank holding a fuel such as gasoline, and a tank containing lubricating oil. Reservoir 11 has a discharge line 13 connected thereto through which the fuel is conducted to a carburetor 14. After vaporization in the carburetor the fuel is directed through a line 15 to an engine 16. Oil from the reservoir 12 is directed to the engine 16 through a discharge line 17, a drain fitting 18 and a line 19, which together constitute the inlet line for the oil flowing to the bearings of the engine. Both the fuel and the lubricating oil are delivered to the engine under pressure, an engine driven pump 21 in the line 13 being provided for feeding the fuel to the carburetor and an engine driven pump 22 in the line 19 serving in a similar manner to withdraw oil from the reservoir 12 and force it into the engine. The lubricating oil is returned to the reservoir 12 by means of a line 23 which may communicate at its engine side with the crankcase. A pump 24 in the line 23 directs the oil emerging from the engine back to the reservoir and cooperates with the pump 22 in maintaining continuous circulation of the oil during operation of the engine. Dilution of the lubricating oil is accomplished by adding thereto a liquid of lower viscosity, such liquid being in this instance gasoline drawn directly from the fuel line 13. It is here contemplated to introduce the gasoline into the oil inlet or feed line made up of conduits 17 and 19 and fitting 18. As shown, a conduit 25 communicates at one end with fuel line 13 and at its other end extends into the drain fitting 18, where, as the oil passes from conduit 17 to conduit 19 it may have mixed therewith a quantity of gasoline. Controlling the flow through line 25 is a valve assembly 26, comprising a valve 27 normally occupying a position closing a passage through the assembly and hence the line 25, and a solenoid 28 adapted when energized to move the valve to a position opening the line 25. The solenoid 28 is in an electrical circuit including a line 29 connected to a source of current, as one side of a battery 31. The other side of the battery has a line also running to the solenoid 28 but comprised of separate leads 32, 33 and 34 connected by control switches 35 and 36 arranged in series. When both switches 35 and 36 are closed a flow of current is established through the solenoid, and, according to the preferred method of operation, the valve 27 is opened to permit the entrance of gasoline into the lubricating system. When the electrical circuit is broken, as by the opening of switch 35 or 36, the solenoid operated valve 27 closes and the passage of gasoline through the conduit 25 is interrupted.

The switch 35 is arranged for manual adjustment, and preferably is located in the pilot's compartment, while the switch 36 may be relatively remote therefrom, being associated with a viscosity responsive instrument 37 and fully automatic in its operation. According to the primary method of operation both switches 35 and 36 must be closed to effect opening of the valve 27, and dilution will continue until manual opening of switch 35 or automatic opening of switch 36 permits the valve 29 to close. By a secondary or alternative method, unit 37 and switch 36 may be made ineffective, and the dilution system made subject to manual control alone. To this end the lead 33 is paralleled by a line 38 extending from the switch 35 to a point in lead 34 beyond switch 36. Switch 35 is constructed and arranged for movement from a fully open ineffective position to two closed or operating positions, in one of which it establishes the current flow through lead 33 and switch 36 and in the other of which flow is established through line 38 in by-passing relationship to the switch 36.

As shown, a signal lamp 39 is interposed in a position between lines 29 and 34 in such wise that the lamp will light when the circuit is closed and be extinguished when the circuit is opened. The signal lamp, which may be mounted on the instrument panel, thus gives a visual indication when lighted that dilution is taking place.

Considering now the viscosity responsive instrument 37 and the manner in which it exercises automatic control over the system it will be observed that a continuous stream of oil is delivered to the instrument through a conduit 41 which communicates at its inlet end with the pressure side of the feed pump 22. After passing through the instrument the oil is discharged to a line 42 which is here indicated as leading to the engine crankcase, but may be connected to any other lower pressure area such as the reservoir 12 or the suction side of the pump 22.

Figure 2:
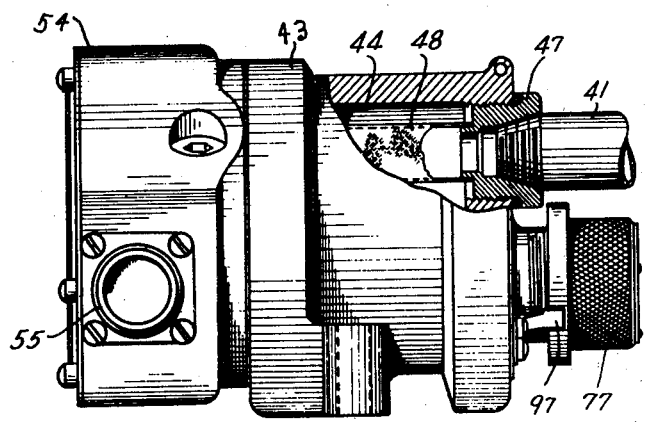
Fig. 2 is a view of the instrument in side elevation, partly broken away to show the inlet thereof.

As will be best understood by reference to the diagrammatic view, Fig. 9, the instrument 37 is comprised of a body portion 43 in which is formed three longitudinal bores 44, 45 and 46. The several bores are in communication, and, in conjunction with their connecting ports and passages, define a passageway whereby a continuous flow of oil may take place through the instrument. As seen also in Fig. 2, the bore 44 constitutes the instrument inlet, there being a gland 47 in the open end of this bore receiving the discharge end of the pipe line 41. A wire mesh bag 48 is attached to the gland 47 within bore 44, and functions as a strainer to deny access to the instrument of any foreign matter that may be in the oil. Communication is established between the bore 44 and the bore 45 by means including a radial port 49. Similarly, a port 51 connects the bore 45 to the bore 46, wherein an outlet opening 52 is adapted to receive an end of the return pipe line 42. Thus, oil entering the instrument 37 is directed first to bore 44 and then passes successively through bores 45 and 46, being finally discharged from the instrument by way of outlet 52 and returned by line 42 to the lubricating system. Within the instrument, in the path of oil flow are devices cooperating to make automatic response to variation in the viscosity condition of the oil and functioning to control operation of the switch 36.

Figure 5:
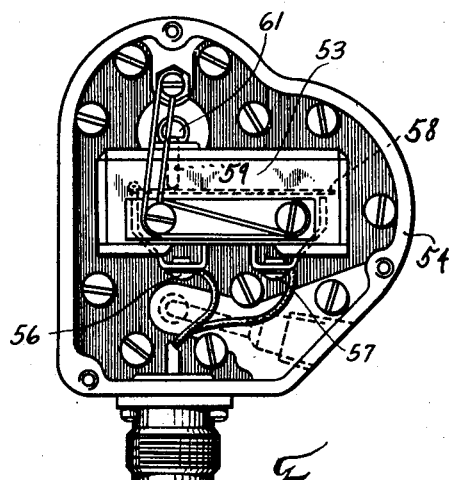
Fig. 5 is a view of the instrument in left hand end elevation, with the cover plate on the switch housing removed.

Referring to Figs. 4 and 5, the switch 36 is disclosed as contained in a case 53 mounted in a housing 54 secured to one end of the instrument body 43. The electrical leads 33 and 34 enter the housing 54 by way of a connector 55 and are respectively attached to contacts 56 and 57 (Fig. 5) in the switch 36. A spring blade 58 is adapted to interconnect the contacts 56 and 57, and is arranged to respond to spring tension in such wise that the circuit through the switch normally is open or normally is closed according to the manner of assembly of the switch. In the present instance the blade 58 continuously is tensioned in a direction to disengage it from the contact 57 and so open the solenoid operating circuit. For the purpose of actuating the spring blade 58, there is provided a plunger 59 which is slidably mounted in the case 53 with its opposite ends respectively inside and outside the casing. The inner end of the plunger 59 is in engagement with the blade 58 while the outer end of the plunger underlies an arm of a bellcrank lever 61. The lever 61 is supported in a diaphragm assembly, comprised of a bushing 62 and a diaphragm 63 and mounted in a switch housing opening opposite the instrument bore 46. The diaphragm 63 is made of flexible metal and has the form of a disc closing one end of the bushing 62 and having a central aperture for the passage of the lever 61 therethrough. The central aperture of the diaphragm 63 is sealed by the introduction of solder or the like in the annular space around the lever 61, which process secures the lever to the diaphragm. According to this construction motion may be transmitted from the housing 54 to the instrument bore 46 without effect on the fluid tight seal established by the diaphragm assembly therebetween, such motion being permitted by flexure of the diaphragm 63. On one side of the diaphragm 63 an arm of the lever 61 extends, as described, to a position overlying the switch actuating plunger 59. On the other side of the diaphragm another arm of lever 61 extends at right angles to that above mentioned and lies within a groove 64 in the face of housing 54 (see Fig. 6). A head on the latter arm of lever 61 projects into the instrument bore 46 where it may be engaged by the closed front end of a piston 65 therein. The piston 65 is pressed into contact with the lever 61 by a spring 66 and normally holds the lever rocked, as shown, in a position engaging and depressing the plunger 59. Accordingly, the switch blade 58 is held against contact 57 and the circuit through switch 36 is maintained closed. Should the piston 65 be caused to move away from the lever 61, the holding force applied by spring 66 through the lever and plunger 59 is disabled, whereupon blade 58 will move away from contact 57 to open the switch circuit. In order that motion of the lever 61 in a direction to close the switch contacts may be limited a stop is provided in the form of an elongated adjustable screw rod 67 which passes through the housing 54 into the groove 64 immediately in back of the lever.

As shown in Fig. 4, the spring 66 is of the compression type and is received in the hollow interior of piston 65, being interposed between the piston and a base assembly comprising a thermostat 68 and a mounting therefor. The thermostat may take a variety of forms, and, in the present instance, is shown to be of that class wherein a thermal substance 69, which has the property of expansion under heat, is confined in a case comprised of interlocked elements 71 and 71a. Element 71a is a bushing wherein a reciprocable piston 72 is mounted, the inner end of the piston being in contact with the thermal substance 69 through a diaphragm and connector assembly 73. The spring 66 seats on a shoulder on element 71 and holds the thermostat 68 in a position in which the piston 72 abuts a stop 74 forming a part of the thermostat mount. The thermostat is disposed in a position intermediate and approximately in line with the fluid flow ports 51 and 52. Accordingly, oil passing through bore 46 on its way to the outlet 52 comes into heat exchange relation with the thermal substance 69. Should the temperature of the oil increase, the volume of the substance 69 becomes greater, the action being such as to attempt to extend the piston 72. The piston is held against such movement by the stop 74, however, so that the thermostat body is constrained to move backwards, relatively to the piston 72, and in a direction to impart a higher degree of compression to the spring 66. In response to a decrease in the temperature of the oil, the expansive force of the substance 69 is lessened and the spring 66 is allowed to lengthen, acting as it does so to return the thermostat body toward its mounting and to compress the thermal substance toward its original volume. The result of such operation is that the initial tension of the spring 66 changes in response to changes in temperature. Thus, as the temperature of the oil becomes progressively higher or lower a proportionately greater or lesser resistance is imposed on movement of the piston 65 from the position illustrated wherein it holds the switch 36 closed by maintaining pressure on lever 61.

The initial tension of the spring 66 further may be varied by hand through longitudinal adjustment of the stop 74. The stop 74 and element 71a of the thermostat case have a sliding fit in a bushing 75 which is mounted in an extension of the bore 46 registering with and opening through an external boss 76 on the instrument body. The stop 74 extends through and beyond the bushing 75 and boss 76, and has attached to its outer end a knob 77. The knob 77 is centrally bored to receive a portion of reduced diameter on the stop 74 and is counterbored to fit over the boss 76. The complementary surfaces of the boss 76 and knob 77 are in threaded engagement, and relative rotary motion of the knob causes an axial advancement and retraction thereof. The stop 74 partakes of the axial motion of the knob 77 and transmits inward motion thereof to the thermostat piston 72 thereby to project the entire thermostatic unit inward, or leftward as viewed in Fig. 4, and further compress the spring 66. A backing off or outward motion of the knob 77 permits withdrawal of the thermostatic unit 68 under the urging of the spring 66 which in so acting expands to a state of lesser compression.

Operation of the piston 65 in opposition to the variable force of spring 66 is accomplished by fluid pressure which gains access to bore 46 by way of the longitudinal groove 64 in housing 54. The piston 65 has a long bearing in a bushing 78 and divides the bore 46 into separate chambers 46a and 46b wherein fluid pressure differentials may prevail and influence operation of the piston. The groove 64 lies opposite the chamber 46a which is a chamber of high pressure as contrasted with the chamber 46b, which, since it is open to the outlet 52, has a pressure corresponding to whatever back pressure may be present in the lines leading to the cranckcase. Chamber 46a in bore 46 is directly connected by the groove 64 to one end of the bore 45. A piston 79 in the bore 45 is reciprocable within a bushing 81 and defines end chambers 45a and 45b in the bore. Chamber 45a communicates through groove 64 with chamber 46a of bore 46, while chamber 45b communicates through opening 51 with chamber 46b.

The piston 79 is hollow and open at both ends, being centrally partitioned by an integral web 82. On that side of the web 82 communicating with chamber 45a of the bore 45, the piston 79 is formed with a series of radial ports 83 opening into an annular groove 84. The groove 84 is opposite a series of radial ports 85 in the bushing 81, which ports register with an annular groove 86 in the bore 45. The previously described port 49 (see Fig. 9) leads from bore 44 to groove 86 so that direct communication may be established between the instrument inlet and chamber 45a of bore 46. The annular groove 84 in the piston 79 defines peripheral lands on the piston. One of the lands so formed lies adjacent the series of bushing ports 85 and is operable in response to reciprocating motion of the piston to increase and reduce the open area of those ports and so admit a greater or lesser quantity of oil to the chamber 45a. Normally, the ports 85 are open to their maximum amount since the piston 79 is pressed by a spring 87 in a direction to uncover the ports. The spring 87 is disposed in the chamber 45b, and is held compressed between the piston web 82 and a base 88 removably mounted in the bushing 81.

A flow of oil from chamber 45a to chamber 45b is permitted through a tube 89 which has a press fit in an opening in web 82. The tube 89 provides an elongated, small diameter bore communicating at one end with the chamber 45a and at the other end with chamber 45b, and so functions as a friction tube. The passage of oil from chamber 45b to chamber 46b of bore 46 is controlled by a plug 91 mounted in opening 51 and formed with an orifice 92. The arrangement of parts accordingly is such as to present a friction tube and an orifice in series, whereby pressures are obtained in the instrument which are directly related to the viscosity condition of the oil. According to the known principle of operation of a friction tube and orifice mechanism, the rate of flow of the fluid through the tube varies with viscosity changes, the flow becoming greater as the viscosity of the oil is reduced and becoming less as the viscosity of the oil is increased. The flow through the orifice 92, however, is substantially independent of viscosity change. Thus, an increased rate of flow through the friction tube results in a rise in pressure in the chamber 45b, brought about by the need for disposing of an added quantity of fluid through an opening of unchanged area. Similarly, a decrease in the rate of flow through the friction tube effects a drop in pressure in chamber 45b since the orifice 92 disposes of the reduced quantity more readily. The pressure in chamber 45b accordingly is determined by and is a function of the viscosity of the oil.

It is desirable from the standpoints of reliability of operation and manufacturing expedience to make the functioning of the instrument independent of variations in inlet pressure and to utilize the pressure in chamber 45a, rather than the pressure in chamber 45b, as the control pressure for operation of the piston 65. To this end there is established a predetermined pressure differential between the chambers 45a and 45b and such differential is maintained constant throughout the pressure variations occurring in chamber 45b. As previously noted, the piston 79 is movable to vary the quantity of oil admitted to the chamber 45a from the inlet bore 44. The oil in chamber 45a creates a fluid pressure which acts on the piston 79 in opposition to the spring 87 and to whatever fluid pressure may be present in chamber 45b. Should the fluid pressure in chamber 45a be greater than the opposing spring force and fluid pressure, the overbalancing force will move the piston to the right, as viewed in Fig. 4, or in a direction to cause a land thereon to reduce the open area of the ports 85. A smaller flow into the chamber 45a results and the pressure therein drops to the value required to balance the opposing forces in chamber 45b. Should a decreased flow into chamber 45a cause a reduction in the fluid pressure therein the piston 79 will move in the direction urged by spring 87 to increase the open area of ports 85 and so cause a rise in pressure in chamber 45a. Throughout automatic adjustment of the piston 79 the pressure in chamber 45a is limited to the value necessary to overcome the resistance of the friction tube and orifice, which value never attains the normal range of inlet pressures.

Concerning the maintenance of a constant fluid pressure differential across the friction tube, such differential is established by the spring 87 which aids the fluid pressure in chamber 45b in opposing the fluid pressure in chamber 45a. In effect therefore, the spring 87 induces the fluid flow through the friction tube from the chamber of higher pressure (chamber 45a) to the chamber of lower pressure (chamber 45b). The degree of pressure differential on opposite sides of the piston 79 is determined by the force of the spring 87 in accordance with a mathematical equation in which the pressure difference multiplied by the area of the piston equals the spring force. Regulatory movement of the piston 79 holds the pressure differential constant. Thus, when a lowered viscosity condition of the oil causes a more rapid flow into the chamber 45b, the pressure therein rises, and the pressure difference at the opposite ends of the piston 79 becomes less. Thereupon the spring 87 moves the piston in a direction to increase the open area of the ports 85 and thereby admit a larger quantity of oil into chamber 45a, with the effect of raising the pressure therein in proportion to the rise in chamber 45b. The piston then is balanced in a new position of adjustment, and, although the pressures in the respective chambers 45a and 45b are higher than formerly the pressure differential therebetween remains the same. In similar fashion a higher viscosity condition of the oil causes a less rapid flow through the friction tube, tending to create a higher pressure drop thereacross, whereupon the excess fluid pressure in chamber 45a moves the piston 79 in a direction to reduce the open area of the ports 85 and cut down the flow of oil into the chamber 45a until the pressure therein correctly compensates for the reduced pressure in chamber 45b.

It is seen, therefore, that the pressures in the chambers 45a and 45b change in response to changes in oil viscosity, and that a given variation in viscosity produces pressure variations which are the same in degree in both chambers. The pressure in either chamber 45a or 45b may be used as a measure of viscosity, and as a matter of convenience the pressure in chamber 45a is selected. The pressure in that chamber is transmitted through the groove 64 in the housing 54 to chamber 46a in front of the switch actuating piston 65. When, in response to a dropping oil viscosity, the pressure in chambers 45a and 46a becomes high enough to overcome the spring 66 the piston 65 moves away from the lever 61, thereby allowing the elements of the switch 36 to assume circuit opening positions.

The viscosity of the oil may be affected both by temperature and by dilution. Since the purpose of the present instrument is to control and regulate the process of dilution, it is desired that the instrument should respond to viscosity changes which are the result of dilution, and that it should suppress response to viscosity changes resulting from temperature. According to the present invention the causes of viscosity change are distinguished by the thermostat 68 disposed in chamber 46b adjacent the outlet 52. A rising oil temperature will produce a lower viscosity condition of the oil flowing through the instrument, and will accordingly effect a pressure rise in chamber 46a in front of piston 65. At the same time, however, the higher temperature of the oil will be reflected in an elongation of the thermostat 68 in a manner to further compress spring 66. Thus a greater pressure in chamber 46a is compensated for by an increased resistance on the part of spring 66 and no operation of the piston 65 results. A reduced viscosity brought about by dilution likewise raises the pressure in chamber 46a but in this instance no concomitant operation of the thermostat 68 takes place and the force of spring 66 is unchanged. As a consequence the fluid pressure at the closed front end of the piston 65 is allowed to build up until sufficient to cause operation of the piston and the resultant opening of switch 36.

Figure 3:
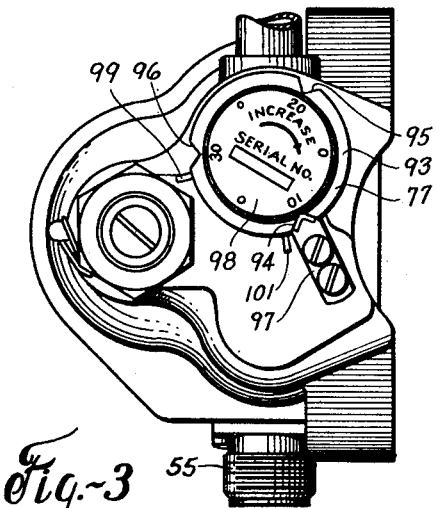
Figure 3 is a view of the instrument in right hand end elevation.

It is possible by changing the initial tension of the spring 66 to vary the point in the percentage dilution scale at which the switch 36 is opened and the dilution process interrupted. That is, the control instrument may be made to respond to whatever viscosity condition represents the desired mixture of gasoline and oil. Such pre-setting of the spring 66 is accomplished by adjustment of the knob 77 to project the thermostat 68 or allow a withdrawal thereof, whereby to effect variations in the state of compression of the spring. In the illustrated embodiment of the invention, means are provided permitting ready and accurate positioning of the knob 77 selectively to cause opening of the switch 36 when a ten percent, twenty percent or thirty percent dilution of the oil is attained. The knob 77 is formed with an annular flange 93 in which is formed three equidistant notches 94, 95 and 96 (see Fig. 3), adapted by rotation of the knob to be moved selectively into engagement with a resilient detent 97. On the front of the knob 77 is a plate 98 appropriately inscribed to indicate that the notches 94, 95 and 96 define adjustment positions for obtaining respectively ten, twenty and thirty percent oil dilution. Thus, when the knob 77 is positioned with the notch 94 engaged by the detent 97 the spring 66 is at a minimum degree of compression (insofar as the three positions under discussion are concerned) and the piston 65 will move away from the switch control lever 61 when the instrument develops a control pressure indicating that a ten percent dilution of the oil has been attained. Upon movement of the knob 77 in a clockwise direction (as viewed in Fig. 3) to move notch 94 out of cooperative relation with the detent 97 and to bring notch 95 into engagement with the detent a greater force of resistance is imparted to the spring 66 and operation of the piston 65 is inhibited until a control pressure is reached indicating the attainment of a twenty percent dilution of the oil. Additional movement of knob 77 in a clockwise direction to engage notch 96 with the detent 97 imparts still further resistance to the spring 66 and no operation of the piston 65 is permitted until a thirty percent dilution is reached. Stops 99 and 101 on knob 77, adapted to limit against the detent 77, are provided to restrict the knob to a range of movement between the ten and thirty percent dilution indications after the initial mounting of the knob has brought the stop 74 into contact with the thermostat 68.

In the operation of the system, the manually operated switch 35 normally stands open and the solenoid valve 27 is closed. Also, the switch 36 is closed and the elements of the instrument 37 are positioned as shown in Fig. 4, with the pistons 65 and 79 in their extreme left hand positions and the knob 77 set to a position of adjustment corresponding to the degree of dilution required by climatic conditions. When the engine is started the pumps 22 and 24 begin circulation of the oil, directing it to and from the engine with a part of the flow going to the instrument 37 by way of line 41. The oil diverted to instrument 37 enters bore 44 through gland 47 and screen 48 (Fig. 2) and is allowed to flow from the inlet bore to chamber 45a of bore 45 through port 49, groove 86, ports 85 in bushing 81 and the series of ports 83 in piston 79. Inside the chamber 45a the oil is permitted access by means of groove 64 to the rear of piston 65 and to friction tube 89, and passes through the latter to the front of piston 79 or chamber 45b.

The incoming fluid presses against the piston 79, attempting to move it rightward against the force of spring 87, and the equation is established by which the pressure difference at the opposite ends of the piston multiplied by the piston area equals the force of the spring. Passing through the orifice 92 to bore 46 and the outlet 52 the oil circulates around the thermostat 68 and returns to the engine crankcase. As operation of the engine warms the oil, the viscosity thereof becomes lower and the rate of flow through friction tube 89 increases in a manner tending to raise the pressure at the opposite ends of the tube, and in chamber 46a. However, as the higher temperature lowers the oil viscosity it simultaneously causes an operation of the thermostat 68 which moves to compress the spring 66 a further degree in proportion to the rise in temperature. Accordingly, no operation of the piston 65 under the increased pressure in chamber 46a is permitted. Compensating adjustment of the thermostat 68 continues throughout operation of the engine as the oil viscosity and temperature change in response to different flight conditions and engine speeds.

When it is desired to bring about oil dilution, with the engine running the operator adjusts the switch 35 to close the solenoid operating circuit, either through the all manual line 38 or through the automatic line 33. The valve 27 opens in response to such adjustment and, if the circuit is established through line 33 further control of the oil dilution operation passes to the instrument 37.

When, in response to the opening of the valve 27 dilution of the oil begins, a gradual lowering of the viscosity of the oil takes place, beyond the value already induced by temperature. The instrument 37 responds to the increased rate of flow that takes place through friction tube 89, in that the pressure in chamber 46a is permitted to rise without a compensating adjustment of the spring 66 being made. As dilution continues, therefore, the fluid pressure differential acting on piston 65 in opposition to the spring 66 rises until it is sufficient to overcome the initial resistance of the spring plus whatever additional resistance has been imparted thereto by extension of the thermostat 68. The resultant motion of piston 65 permits rocking of the lever 61 and separation of the contacts of switch 36 to break the solenoid operating circuit. In consequence, the valve 27 closes and the dilution process is discontinued.

It will be understood that the invention has been disclosed in merely one of the forms it may assume and that wide modification may be made in its use, mode of operation and structural details without departing from the spirit or scope thereof. It further is clear that the principle employed by the viscosity responsive instrument in identifying and measuring viscosities has a broad application in the field of regulating apparatus. In dilution systems, for example, motion of the piston 65 might be transmitted to any control device or could be used to actuate the dilution control valve directly.

What is claimed is:

1. In an instrument for measuring viscosity in a system in which liquid is circulated under pressure and under conditions of changing temperature, means for transforming changes of viscosity into changes of pressure, means movable in response to such changes of pressure, spring means resisting motion of said movable means in one direction, and means responsive to the temperature of the liquid flowing through said instrument for imparting increased and reduced force to said spring means.

2. In a control instrument for use in a system for diluting the lubricating oil of internal combustion engines, said instrument defining a flow path for the oil therethrough, means for causing the pressure of the oil in a portion of said flow path to rise in response to a lowering viscosity of the oil, actuating means movable in response to rising pressure, spring means resisting such movement of said actuating means, and means for increasing and reducing the force of resistance of said spring means respectively in response to an increase and decrease in the temperature of the oil in said flow path.

3. In an instrument for measuring viscosity in a system in which liquid is circulated under pressure and under conditions of changing temperature, said instrument defining a flow path for the liquid therethrough, means for transforming changes of viscosity in said flow path into changes of pressure, pressure responsive means movable under the control of said pressures, a compression spring resisting motion of said pressure responsive means in one direction, and a thermostat providing a base for said spring and operable in response to temperature changes in the liquid in said flow path to increase and reduce the force of resistance of said spring.

4. In an instrument for measuring viscosity in a system in which liquid is circulated under pressure and under conditions of changing temperature, a friction tube and an orifice arranged in series in said instrument and defining a flow path therethrough, whereby to establish a control pressure which is a function of viscosity, actuating means movable in response to the attainment of a control pressure of predetermined value, and means interposed in the path of the liquid flowing through said instrument for imposing a variable resistance to the movement of said actuating means in response to changes in temperature.

5. In an instrument for measuring viscosity in a system in which liquid is circulated under pressure and under conditions of changing temperature, a friction tube and an orifice arranged in series in said instrument and defining a flow path therethrough, whereby to establish a control pressure which is a function of viscosity, actuating means movable in response to variations in said control pressure, means for holding said actuating means against movement until a control pressure of predetermined value is attained, and means responsive to the temperature of the liquid in said flow path for changing the characteristics of said holding means to impart increased and reduced resistance to the operation of said actuating means as such temperature rises and falls.

6. In a control instrument for use in a system for diluting the lubricating oil of an internal combustion engine, a friction tube and an orifice arranged in series and in communication with the oil line, whereby to obtain a control pressure which is the function of viscosity, rising as the viscosity of the oil decreases and falling as the viscosity of the oil increases, actuating means movable in response to a rising control pressure, spring means resisting such motion of said actuating means, and a thermostat affected by the temperature of the oil passing through the instrument for varying the force of said spring means, increasing such force as the temperature rises and decreasing such force as the temperature falls.

7. In an instrument for measuring viscosity in a system in which liquid is circulated under pressure and under conditions of changing temperature, a friction tube and an orifice arranged in series in said instrument and defining a flow path therethrough, liquid flow control means for causing the pressure at a predetermined end of said friction tube to vary in response to changes in liquid viscosity, means movable in response to variations in the pressure at said one end of the friction tube, a spring resisting motion of said movable means in one direction, and temperature responsive means disposed in the flow path through said instrument for varying the force of said spring in response to changes in the liquid temperature.

8. An instrument according to claim 7 characterized in that said temperature responsive means resides in a thermostat mounted as a base for said spring, whereby movement of said thermostat serves to increase and reduce the force of resistance of said spring.

9. An instrument for measuring the percentage dilution of a liquid circulating in a system which liquid is subject to changes in viscosity due to changes in temperature conditions and dilution; comprising movable pressure responsive means; a friction tube and an orifice arranged in series and defining a flow path for liquid in said system; liquid flow control means cooperating with said friction tube and orifice to transform a decrease in liquid viscosity at a selected point in said flow path into a rise in pressure; means exposing said pressure responsive means to said pressure, said pressure responsive means being movable in response to the attainment of a high pressure of predetermined value; and means effecting automatic increase in the pressure value at which said pressure responsive means moves in response to a rise in the temperature of the liquid in the system.

10. An instrument for measuring the percentage dilution of a liquid circulating in a system which liquid is subject to changes in viscosity due to changes in temperature conditions and dilution; comprising means defining a flow path in said instrument through which liquid from said system continually circulates, means for transforming a decrease in viscosity in the liquid in said flow path into a rise in pressure, pressure responsive actuating means exposed to such pressure and movable in response to the attainment of a high pressure of predetermined value, and means effecting automatic increase in the pressure value at which said pressure responsive means moves in response to a rise in the temperature of the liquid in the system.

11. A method of measuring viscosities which are the function of conditions other than temperature in a system in which fluid is circulated under pressure and under conditions of changing temperature, which method comprises placing in communication with said system an instrument wherein changes in fluid viscosity are transformed into changes of pressure, utilizing such pressure to operate pressure responsive control means, preventing operation of said control means until a pressure of predetermined value is obtained, and effecting automatic variation in the pressure value at which said pressure responsive means moves in response to changes in the temperature of the liquid in the system.

12. An instrument for measuring viscosity in a system in which liquid is circulated under pressure and under conditions of changing temperature, comprising a friction tube and an orifice arranged in series in the flow path through the instrument, liquid flow control means cooperating with said friction tube and orifice to cause a pressure at one end of said friction tube to vary in a predetermined relation with changes in viscosity, pressure responsive means movable under the control of such pressure, spring means acting on said pressure responsive means in opposition to said liquid pressure, and thermal means affected by the temperature of the liquid in the system for imparting increased and reduced force to said spring means.

13. In an instrument for measuring viscosity in a system in which liquid is circulated under pressure and under conditions of changing temperature, said instrument defining a flow path for the liquid therethrough, means for transforming changes of viscosity in said flow path into changes of pressure, pressure responsive means movable under the influence of said pressures, a compression spring resisting motion of said pressure responsive means in one direction, said spring having an initial tension capable of balancing said pressure responsive means against an opposing pressure of predetermined value, a thermostat providing a base for said spring and operable in response to a rise in liquid temperature to increase the force of resistance of said spring beyond said initial tension, and manipulative means for moving said thermostat to change the initial tension of said spring.

14. An instrument for measuring the percentage dilution of a liquid circulating in a system which liquid is subject to changes in viscosity due to changes in temperature conditions and dilution; means for establishing in said instrument a control pressure which rises in response to a lowering viscosity whether such viscosity change is the result of higher temperatures or of dilution; pressure responsive means movable under the influence of said control pressure; a compression spring resisting movement of said pressure responsive means by said control pressure, said spring having an initial tension permitting yielding of the spring under a control pressure of predetermined value; and temperature responsive means for modifying the action of said spring, said temperature responsive means operating concomitantly with a rise in control pressure due to temperature change to effect a compensating increase in the force of resistance of said spring, whereby movement of said pressure responsive means is inhibited except under the influence of a control pressure rising in response to a viscosity change which is a function of dilution.

15. The combination of means responsive to the viscosity condition of the fluid in a system flowing fluid of variable temperature to create a pressure which rises and falls in inverse relation with changes in fluid viscosity, means movable under such rising pressure, restraining means inhibiting motion of said movable means until a rise in pressure indicating a predetermined low viscosity value is attained, and means acting in response to a rise in fluid temperature to impart increased power to said restraining means whereby to lower the viscosity value at which said movable means is permitted to move.

16. The combination of means for transforming changes of fluid viscosity in a system flowing fluid of variable temperature into changes of pressure, a lowering viscosity inducing rising pressure and a rising viscosity inducing lowering pressure; pressure responsive means having motion in response to such rising pressure; a compression spring resisting motion of said pressure responsive means, said spring having an initial tension capable of balancing said pressure responsive means against an opposing pressure of predetermined value, and a thermostat providing a base for said spring and operable in response to a rise in fluid temperature to increase the force of resistance of said spring beyond said initial tension.

HARRY T. BOOTH.

REFERENCES CITED

The following references are of record in the file of this patent:

UNITED STATES PATENTS

| Number | Name | Date |
|---|---|---|
| 1,534,091 | Smoot | Apr. 21, 1925 |
| 1,664,039 | Wermine | Apr. 3, 1928 |
| 1,871,287 | Whittaker | Feb. 11, 1941 |
| 2,012,550 | Powis | Aug. 27, 1935 |
| 2,033,302 | Rockwell | Mar. 10, 1936 |
| 2,121,045 | Paynter | June 21, 1938 |
| 2,139,050 | Vickers | Dec. 6, 1938 |
| 2,208,444 | Bailey | July 16, 1940 |
| 2,231,211 | Halsey et al. | Feb. 11, 1941 |
| 2,311,069 | Miller | Feb. 16, 1943 |